D. T. YEAKEL.
MODE OF CONSTRUCTING ORDNANCE.
No. 35,124. Patented Apr. 29, 1862.
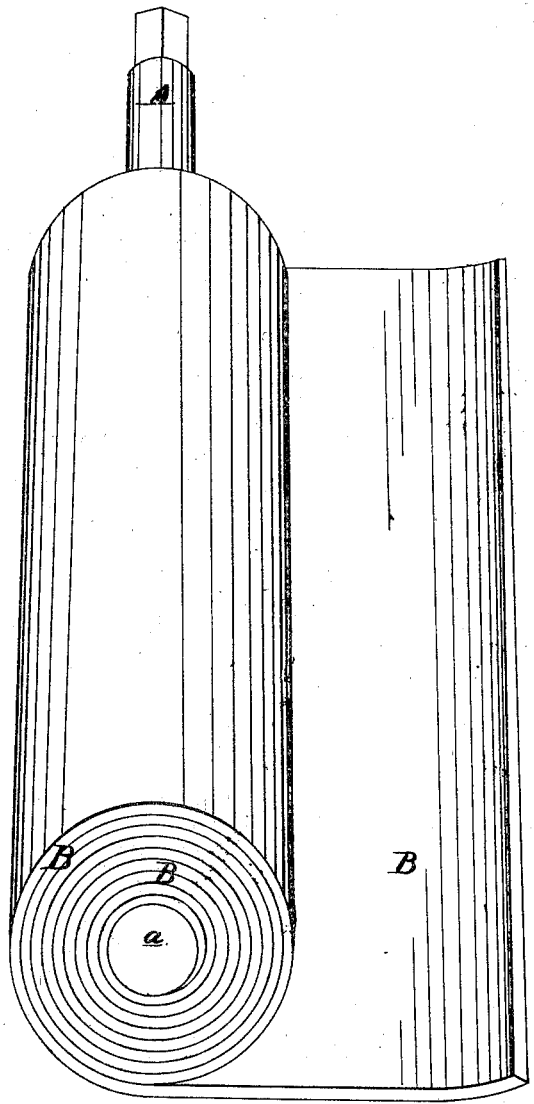
Witnesses
Inventor

UNITED STATES PATENT OFFICE.

DAVID T. YEAKEL, OF LAFAYETTE, INDIANA.

IMPROVEMENT IN MODE OF CONSTRUCTING ORDNANCE.

Specification forming part of Letters Patent No. 35,124, dated April 29, 1862.

*To all whom it may concern:*

Be it known that I, DAVID T. YEAKEL, of Lafayette, county of Tippecanoe and State of Indiana, have invented a new and improved mode of making cannon and other ordnance, and likewise hollow and solid cylinders for heavy shafting, out of wrought-iron plate, or steel plate, or both combined; and I do hereby declare that the following is a full and exact description thereof, reference being had to the accompanying drawing, and to the letters of reference marked thereon.

One of my modes consists in rolling and welding at the same time a plate or sheet of iron or steel, B B B, (see drawing,) to and around a central mandrel of wrought-iron or steel, A a, thereby consolidating the whole by the pressure of rollers or the impact of hammer or hammers at a welding heat; or the plate or sheet or several of them may be first wound and welded afterward. The mandrel A a should be of a less diameter than the desired bore of gun-barrel or shaft-cylinder, if hollow, that the boring may remove all of it to the inspected metal B B B.

My second mode consists of using a cold mandrel of less diameter than desired bore, and to roll and weld upon it the plate of iron or steel at a welding heat until the desired form of forging is accomplished, and then to remove the mandrel and to bore, ream, and turn in the same way as is now pursued with cast guns and cylinders. Other modes will readily suggest themselves. The plate used should be of sufficient length, when used in one piece, to produce when rolled and welded the barrel or cylinder of the desired thickness or diameter before turning, and of a breadth six to twelve inches wider than the desired length of barrel or cylinder. This sheet or plate of iron or steel may be used of a uniform thickness, or it may be tapered from one edge of its breadth to the other, so as to produce when rolled and welded the approximate shape of barrel before turning. If used of a uniform thickness, the rolling and welding must be continued until a sufficient diameter is obtained at the breech.

If it should be desired to construct a barrel or cylinder of the same or different qualities of metal presenting the fiber of the metal in a crucial form, my process offers no obstacle. In that case a plate of determinate length would first be rolled and welded to or in the mandrel, presenting the fiber transversely to the mandrel. Then a plate would be rolled and welded presenting its fiber longitudinally, and so continued until forging was done.

If the gun is to be a muzzle-loading gun, it may be bored as gun-castings now are; but I should prefer a breech-pin of a superior metal screwed into the bore at the breech.

The application of my mode of making hollow cylinders for heavy shafting is obvious. Shafting is required for large class steamers of greatest possible strength, and as generally used in the form of casting or solid forging are of immense and inconvenient weight, rendering it impossible for them to be carried in duplicate form; but by my process they could be made in the hollow form very much lighter and in sections, one or two duplicates of which, if carried in ballast, could readily, in case of accident to the shaft, be adjusted at sea. By this mode it will be seen that the most carefully-consolidated plates of iron or steel are rolled and welded together in one continuous length, thereby producing a quality—viz., uniform consolidation of metal and a form of barrel composed of concentric welded folds—capable of offering a resistance to the explosive force of powder, which cannot be obtained in any other way.

The objections urged against many other plans used to produce a strong barrel for ordnance—viz., imperfect welding and the great expense of the same—do not apply to this mode, for the welding is uniform and the expense will not greatly exceed the rolled iron or steel in plate.

What I claim as my invention, and desire to secure by Letters Patent, is—

The use of plate or sheet iron or steel in the manufacture or construction of large iron or steel cylinders by winding the plate or sheet iron or steel, the plate or sheet being in width equal to the desired length of the cylinder, around a central mandrel until by repeated continuous layers the intended size is produced, and after the first layer around the central mandrel, (which may or may not be welded to the mandrel,) each part of the plate or sheet of iron or steel so wound to be welded to the part immediately under it.

D. T. YEAKEL.

Attest:
JOHN S. HOLLINGSHEAD,
JOB W. ANGUS.